United States Patent
Okazaki (10) Patent No.: US 9,752,668 B2
(45) Date of Patent: Sep. 5, 2017

(54) DIFFERENTIAL DEVICE WITH LIMITED-SLIP DIFFERENTIAL MECHANISM

(71) Applicant: OS GIKEN CO., LTD., Okayama-shi (JP)

(72) Inventor: Masaharu Okazaki, Okayama (JP)

(73) Assignee: OS GIKEN, CO., LTD., Okayama-shi (JP)

(*) Notice: Subject to any disclaimer, the term of this patent is extended or adjusted under 35 U.S.C. 154(b) by 40 days.

(21) Appl. No.: 14/806,885

(22) Filed: Jul. 23, 2015

(65) Prior Publication Data

US 2016/0025202 A1    Jan. 28, 2016

(30) Foreign Application Priority Data

Jul. 26, 2014   (JP) ................................. 2014-152446

(51) Int. Cl.
| | | |
|---|---|---|
| *F16H 48/22* | (2006.01) | |
| *F16H 48/40* | (2012.01) | |
| *F16H 48/08* | (2006.01) | |
| *F16H 48/20* | (2012.01) | |

(52) U.S. Cl.
CPC ............. *F16H 48/22* (2013.01); *F16H 48/40* (2013.01); *F16H 48/08* (2013.01); *F16H 2048/207* (2013.01)

(58) Field of Classification Search
None
See application file for complete search history.

(56) References Cited

U.S. PATENT DOCUMENTS

| | | | | | |
|---|---|---|---|---|---|
| 3,264,901 | A * | 8/1966 | Ferbitz | ................... | F16H 48/08 475/235 |
| 4,059,026 | A * | 11/1977 | Stritzel | ................... | F16H 48/08 192/108 |
| 4,305,313 | A * | 12/1981 | Konkle | ................... | F16H 48/08 475/230 |
| 6,283,889 | B1 * | 9/2001 | Bordner | ................. | F16H 48/08 475/231 |
| 2002/0132694 | A1 * | 9/2002 | Okazaki | ................. | F16H 48/22 475/231 |
| 2003/0121750 | A1 * | 7/2003 | Teraoka | ................. | F16H 48/22 192/93 A |
| 2004/0185983 | A1 * | 9/2004 | Chung | ................... | B60K 17/16 475/231 |

(Continued)

FOREIGN PATENT DOCUMENTS

| | | |
|---|---|---|
| JP | 2000-104807 A1 | 4/2000 |
| JP | 2003-130181 A1 | 5/2003 |

*Primary Examiner* — Erin D Bishop
*Assistant Examiner* — Lori Wu
(74) *Attorney, Agent, or Firm* — Kratz, Quintos & Hanson, LLP (57) ABSTRACT

A differential device with a limited-slip differential mechanism in which, while preventing full compression of spring members to avoid problems resulting from it, the spring members are configured to be as small in diameter as possible to allow the pressure-contact surfaces of a differential case to be wide for clutch plates, whereby it is possible to prevent problems such as a local increase in surface pressure between the clutch plates and scratches on the clutch plates caused by the inner peripheral edges of the pressure-contact surfaces, and achieve improvement in durability of the differential device.

8 Claims, 7 Drawing Sheets

(56) References Cited

U.S. PATENT DOCUMENTS

| | | | |
|---|---|---|---|
| 2006/0046890 A1* | 3/2006 | Aikawa | B60K 23/0808 475/231 |
| 2007/0135254 A1* | 6/2007 | Okazaki | F16H 48/08 475/160 |
| 2009/0321210 A1* | 12/2009 | Tung | F16D 13/648 192/70.14 |
| 2012/0053002 A1* | 3/2012 | Schmidt | F16D 28/00 475/231 |

\* cited by examiner

DIFFERENTIAL DEVICE WITH LIMITED-SLIP DIFFERENTIAL MECHANISM

TECHNICAL FIELD

The present invention relates to differential devices with a limited-slip differential mechanism.

BACKGROUND ART

As differential devices for vehicles, there are widely employed differential devices with a limited-slip differential mechanism configured to, even when one wheel on the vehicle is lifted and run idle, transfer sufficient torque to the other wheel via a clutch means to prevent situations in which, when the one wheel rises up over ice, snow, or mud, for example, and runs idle, sufficient torque is not transferred to the other wheel to disable the vehicle to be started, or in which the vehicle fishtails during cornering or at sudden starting or the like.

A differential device with a limited-slip differential mechanism includes a clutch means that can limit a differential in a differential means, disc springs that apply pre-pressures to the clutch means, and a differential limiting operation means that presses and operates the clutch means in an axial direction.

In general, the disc springs are arranged in annular storage grooves formed in a differential case opposed to clutch plates, and are configured to be fully compressed into an almost completely flat shape in a differential-limited condition so that the disc springs receive pressure acting on the clutch plates (for example, refer to Patent Document 1).

However, when being fully compressed, the disc springs become warped toward the opposite sides or undergo wear and tear, which causes a problem that no stable initial torque can be obtained. In addition, the fully-compressed disc springs do not allow their spring force to act on the clutch means. Thus, if the disc springs are fully compressed when the clutch means is pressed and operated by the differential-limiting operation means to limit a differential, the spring force of the disc springs does not act on the clutch means, which causes slippage in the clutch means and gives a driver a feeling of strangeness.

To solve such problems, there has been suggested a differential device with a limited-slip differential mechanism in which the depth of storage grooves for storing disc springs are set to be larger than the thickness of the disc springs, thereby preventing full compression of the disc springs (for example, refer to Patent Document 2).

CITATION LIST

Patent Literatures

Patent Document 1: JP-A No. 2000-104807
Patent Document 2: JP-A No. 2003-130181

SUMMARY OF INVENTION

Technical Problem

In the differential device described in Patent Document 2, when the clutch means is pressed and operated in the axial direction by the differential-limiting operation means, the disc springs are stored in the storage grooves without being fully compressed. Thus, the pressing and operating force is somewhat received by spring force of the disc springs, but its most part is received by, the pressure-contact surfaces of the differential case on the outer peripheral sides of the storage grooves. However, the differential device described in Patent Document 2 is basically configured such that the depth of the storage grooves opposed to the clutch plates are merely larger than the thickness of the disc springs, and thus the pressure-contact surfaces on the outer peripheral side of the storage grooves are narrow and surface pressure between the clutch plates and the pressure-contact surfaces becomes high in differential-limited conditions. Accordingly, surface pressure between the clutch plates becomes high at positions corresponding to the pressure-contact surfaces, and becomes low at the other positions, which results in an imbalanced pressure state. This deteriorates durability of the differential device and causes a problem that the corner portions at the inner peripheral edges of the pressure-contact surfaces contact violently and scratch the clutch plates.

An object of the present invention is to provide a differential device with a limited-slip differential mechanism in which, while preventing full compression of spring members to avoid problems resulting from it, the spring members are configured to be as small in diameter as possible to allow the pressure-contact surfaces of a differential case to be wide for clutch plates, whereby it is possible to prevent problems such as a local increase in surface pressure between the clutch plates and scratches on the clutch plates caused by the inner peripheral edges of the pressure-contact surfaces, and achieve improvement in durability of the differential device.

Solution to Problems

A differential device with a limited-slip differential mechanism according to the present invention, includes: a differential case that rotates by a driving force from an engine; a differential means that distributes the rotation of the differential case to right and left axles; a clutch means that is capable of limiting a differential in the differential means; an annular spring member that applies a pre-pressure to the clutch means; and a differential-limiting operation means that presses and operates the clutch means in an axial direction, wherein a pressure-contact surface capable of pressure-contact with the clutch means is provided in the differential case on an outer peripheral side of a surface axially opposed to the clutch means, a downward stair with a larger height than height of the spring member in a fully-compressed state is provided at an inner peripheral edge of the pressure-contact surface, an annular spring storage part for storing the spring member is provided in the differential case on an inner peripheral side of the pressure-contact surface across the stair, and the inner peripheral edge of the spring member is arranged on a radially inner side than inner peripheral edges of a plurality of clutch plates constituting the clutch means.

In the differential device, when the differential case rotates by a driving force from the engine, the rotation of the differential case is distributed by the differential means to the right and left axles. Then, if rotational resistances in right and left wheels are the same, the rotation of the differential case is distributed to the right and left axles such that the right and left wheels rotate at the same speed. If rotational resistances in the right and left wheels are different, the rotational speed of the wheel with a smaller rotational resistance becomes higher than the rotational speed of the differential case, and the rotational speed of the wheel with a larger rotational resistance becomes lower than the rotational speed of the differential case, the wheels enter the differential state in which the rotational differences exist between the right and left axles and the differential case. At that time, the clutch means is pressed and operated in the axial direction by the differential-limiting operation means according to the rotational difference between the right and left axles. With a small rotational difference, the pressing and operating force from the differential-limiting operation means is weak, and thus the wheels can almost freely rotate relative to each other to keep the differential state, although the pre-pressure of the spring member acts on adjacent clutch plates. Meanwhile, with a large rotational difference, the pressing and operating force from the differential-limiting operation means becomes strong accordingly, and large contact pressures act on the adjacent clutch plates. According to this, part of rotation torque of the wheel with a smaller rotational resistance is distributed to the wheel with a larger rotational resistance, whereby the wheels enter a differential-limited state in which the differential between the right and left wheels is limited.

In addition, in the differential device, the annular spring member for applying pre-pressures to the clutch means is arranged in the annular spring storage part formed in a downward direction via the stair with a larger height than the height of the spring member in the fully-compressed state. Thus, even when the spring member is pressed toward the pressure-contact surface by the differential-limiting operation means via the clutch means, the spring member is stored in the spring storage part without being fully compressed. Accordingly, it is possible to prevent problems caused by full compression of the spring member in the differential-limited condition, that is, problems that disc springs as the spring members are warped toward the opposite sides, the spring member is prone to undergo wear and tear, a biasing force of the spring member becomes small during transition from the differential state to the differential-limited state to cause slippage in the clutch means which gives the driver a feeling of strangeness. In addition, in the differential-limited condition, most part of the pressing and operating force from the differential-limiting operation means is received by the pressure-contact surface of the differential case. In the differential device according to the present invention, however, the inner peripheral edge of the spring member is arranged on the radially inner side than the inner peripheral edges of the plurality of clutch plates constituting the clutch means, which makes it possible to configure the spring member with a small diameter so that the differential case has a wide contact-pressure surface to increase the contact areas between the clutch plates and the pressure-contact surface in the differential case. Accordingly, it is possible to prevent a local increase in surface pressure between the clutch plates in the differential-limited condition and lower the surface pressures between the clutch plates and the pressure-contact surfaces, thereby to prevent scratches on the clutch plates caused by the inner peripheral edge of the pressure-contact surface and improve durability of the differential device.

As the spring member, a disc spring or a wave spring can be provided. The spring member can be configured in an arbitrarily annular shape. However, it is preferred to employ a disc spring or a wave spring to apply a sufficient pre-pressure to the clutch plates. The wave spring can be configured in a well-known shape such as an annular shape or a coil shape.

It is preferred that the inner peripheral edge of the spring member is configured to be smaller in diameter than a groove bottom surface of a fitting part of a side gear fitted into the clutch plates. By this configuration, the spring member can be made further smaller in diameter and the pressure-contact surface of the differential case can be made further wider, thereby to set the contact areas between the clutch plates and the pressure-contact surface of the differential case to be as large as possible.

In a preferable mode, the width of the pressure-contact surface of the differential case is set to 80 to 55% of the width of sliding surfaces between the clutch plates. If the width of the pressure-contact surface of the differential case is less than 55% of the width of the sliding surfaces between the clutch plates, the surface pressures of the clutch plates on the pressure-contact surface of the differential case become high in the differential-limited condition, which causes problems that the surface pressures between the clutch plates locally increases and the clutch plates are scratched by the inner peripheral edge of the pressure-contact surface. If the width of the pressure-contact surface of the differential case exceeds 80%, the areas of the clutch plates pressed by the spring member cannot be sufficiently provided. Thus, the preferable setting is between 80 to 55%.

It is preferred that, of the plurality of clutch plates constituting the clutch means, the clutch plates to be in pressure-contact with the pressure-contact surface are thicker than the other clutch plates. Specifically, if the clutch plates to be in pressure-contact with the pressure-contact surface are made thin, they may be prone to elastically deform around the inner peripheral edge of the pressure-contact surface and thus may be scratched by contact with the inner peripheral edge of the pressure-contact surface. This is why the clutch plates to be in pressure-contact are preferably thicker than the other clutch plates. It is preferred in particular that, of the plurality of clutch plates constituting the clutch means, the thickness of the clutch plates to be in pressure-contact with the pressure-contact surface is set to 120 to 140% of that of the other clutch plates. If the thickness of the clutch plates to be in pressure-contact with the pressure-contact surface is less than 120% of the thickness of the other clutch plates, the clutch plates may be scratched by contact with the inner peripheral edge of the pressure-contact surface. If the thickness of the clutch plates to be in pressure-contact exceeds 140%, the differential device increases in weight and size. Thus, the preferable setting is between 120 to 140%.

It is preferred that the differential means includes: a pair of side gears that is provided at axle ends of the right and left axles so as to be incapable of relative rotation and is concentrically opposed to each other in the differential case; a pinion shaft that is provided between the pair of side gears orthogonal to axial cores of the side gears and is rotated with the differential case; and at least one pair of pinion gears that is rotatably provided at the pinion shaft and is engaged with the pair of side gears. However, the differential means may be configured in a different manner not including the side gears, the pinion shaft, and the pinion gears.

The differential-limiting operation means may be configured to have a pressure ring that presses the clutch means onto the pressure-contact surface of the differential case against the biasing force of the spring member, according to the relative rotation force of the pinion shaft and the differential case.

In a preferable mode, the plurality of clutch plates constituting the clutch means is composed of one or more inner pawl discs and outer pawl discs that are alternately arranged in the axial direction of the side gears between the inner peripheral surface of the differential case and the outer peripheral surfaces of the side gears, the outer pawl discs being opposed to the pressure-contact surface of the differential case. The inner pawl discs may be configured to be brought in pressure-contact with the pressure-contact surface of the differential case in the differential-limited condition. However, since the outer pawl discs rotate integrally with the differential case, the outer pawl discs are preferably configured to be brought in pressure-contact with the pressure-contact surface of the differential case for the purpose of preventing abrasion on the pressure-contact surface of the differential case and improving durability of the differential device.

Advantageous Effects of Invention

According to the differential device with a slip-limited differential mechanism according to the present invention, basically as with conventional differential devices with a slip-limited differential mechanism, if rotational resistances in the right and left wheels are the same, the right and left wheels rotate at the same speed, and if rotational resistances in the right and left wheels are different, the rotational speed of the wheel with a smaller rotational resistance becomes higher than the rotational speed of the wheel with a larger rotational resistance, and the wheels enter the differential state. Meanwhile, with a large rotational difference between the right and left wheels, large contact pressures act on the adjacent clutch plates accordingly, and part of rotation torque of the wheel with a smaller rotational resistance is distributed to the wheel with a larger rotational resistance, whereby the wheels enter a differential-limited state in which the differential between the right and left wheels is limited.

In addition, in the differential device, the annular spring member for applying a pre-pressure to the clutch means is arranged in the annular spring storage part formed in a downward direction via the stair with a larger height than the height of the spring member in the fully-compressed state. Thus, even when the spring member is pressed toward the pressure-contact surface by the differential-limiting operation means via the clutch means, the spring member is stored in the spring storage part without being fully compressed. Accordingly, it is possible to prevent problems caused by full compression of the spring member in the differential-limited condition, that is, it is possible to prevent that a disc spring as the spring member is warped toward the opposite side, the spring member is prone to undergo wear and tear, the biasing force of the spring member becomes small during transition from the differential state to the differential-limited state to cause slippage in the clutch means which gives the driver a feeling of strangeness. In addition, in the differential-limited condition, most part of the pressing and operating force from the differential-limiting operation means is received by the pressure-contact surface of the differential case. In the differential device according to the present invention, however, the inner peripheral edge of the spring member is located on the radially inner side than the inner peripheral edges of the plurality of clutch plates constituting the clutch means, which makes it possible to configure the spring member with a small diameter so that the differential case has a wide contact-pressure surface to increase the contact areas between the clutch plates and the pressure-contact surface in the differential case. Accordingly, it is possible to prevent a local increase in surface pressure between the clutch plates in the differential-limited condition and lower the surface pressures between the clutch plates and the pressure-contact surface, thereby to prevent scratches on the clutch plates caused by the inner peripheral edge of the pressure-contact surface and improve durability of the differential device.

DESCRIPTION OF EMBODIMENTS

An embodiment of the present invention will be described below with reference to the drawings.

Figure 1:
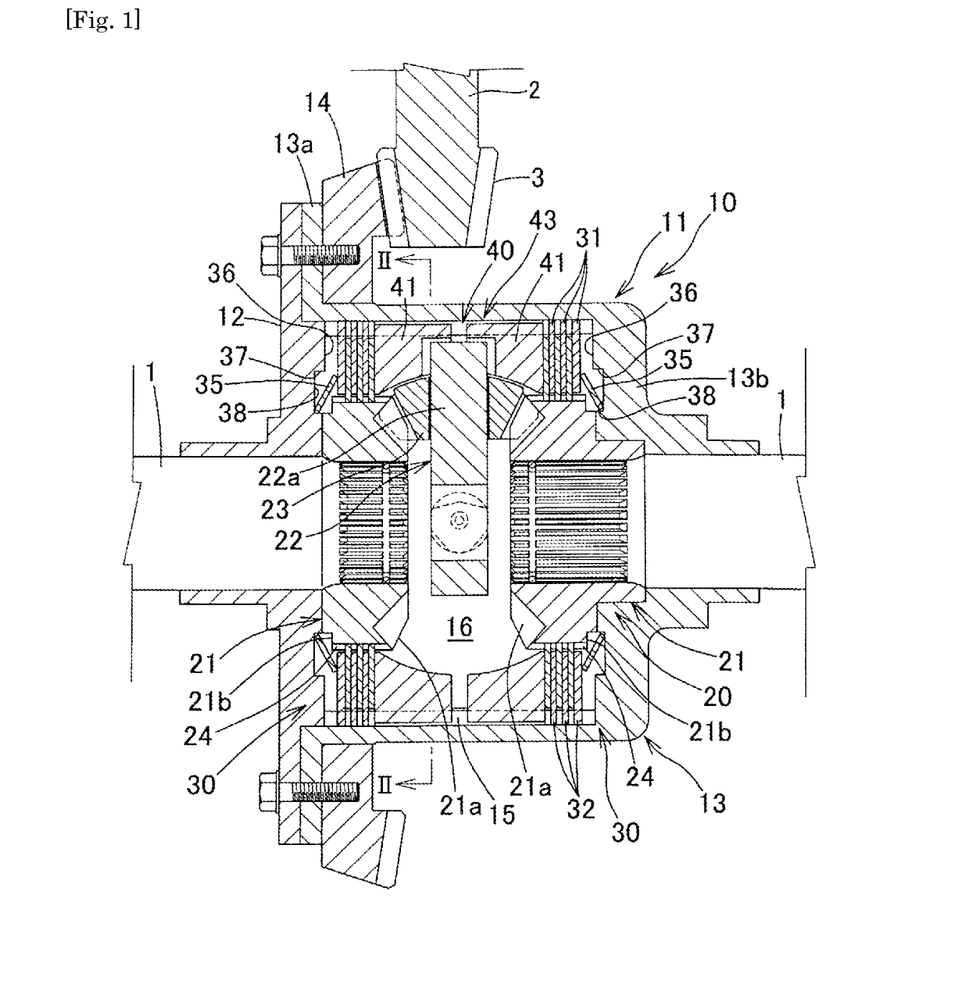
FIG. 1 is a transverse cross-section view of a differential device (cross-section view of FIG. 2 taken along line I-I)
Figure 2:
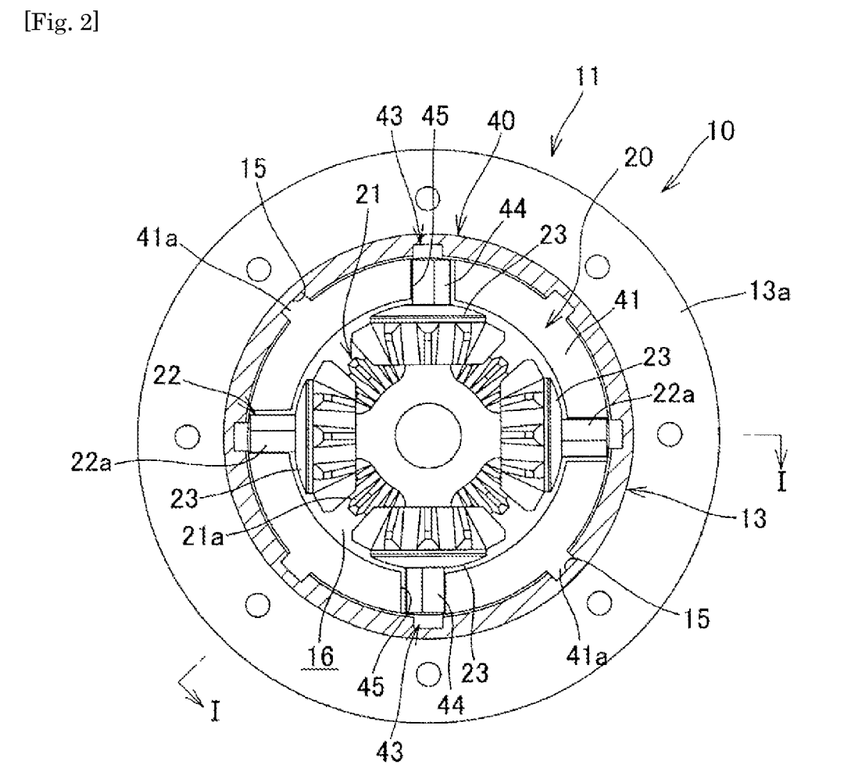
FIG. 2 is a cross-section view of FIG. 1 taken along line II-II.

As shown in FIGS. 1 and 2, a differential device 10 with a slip-limited differential mechanism is a differential device specifically for FR vehicles, including: a differential case 11 that rotates by a driving force from an engine; a differential means 20 that distributes the rotation of the differential case 11 to right and left axles 1; a clutch means 30 that can limit a differential in the differential means 20; annular spring members 35 that apply pre-pressures to the clutch means 30; and a differential-limiting operation means 40 that presses and operates the clutch means 30 in an axial direction to limit a differential between the right and left axles 1.

The differential means 20 includes: a pair of right and left side gears 21 that is provided at axle ends of the right and left axles 1 in the differential case 11 so as to be incapable of relative rotation; a pinion shaft 22 that is provided between the pair of right and left side gears 21 orthogonal to axial cores of the side gears 21 and is rotated with the differential case 11; and at least one pair of pinion gears 23 that is rotatably provided at the pinion shaft 22 and engaged with gear parts 21a of the pair of right and left side gears 21. However, the differential means 20 may be configured in a different manner not including the side gears 21 and the pinion gears 23 formed from bevel gears and, for example, may be arbitrarily configured as a planetary gear-type differential means, a worm gear-type differential means, or the like.

The clutch means 30 includes a plurality of clutch plates that is composed of one or more inner pawl discs 31 and outer pawl discs 32 that are alternately arranged in the axial direction of the side gears 21 between the inner peripheral surface of the differential case 11 and the outer peripheral surfaces of the side gears 21. The inner pawl discs 31 are engaged with the side gears 21 so as to be capable of moving along the axles and incapable of relative rotation. The outer pawl discs 32 are engaged with the differential case 11 so as to be capable of moving along the axles and incapable of relative rotation.

The differential-limiting operation means 40 includes: a pair of right and left pressure rings 41 capable of moving along the axles and incapable of relative rotation that are attached in the differential case 11 so as to cover outer peripheral sides of the right and left gears 21; and an operation means 43 that can operate the both pressure rings 41 in a direction in which a clearance 42 between the pressure rings 41 increases, and is provided on the right and left pressure rings 41 and the axial end of the pinion shaft 22 located between the pressure rings 41.

The differential case 11 is split into a lid member 12 and a case main body 13, and the lid member 12 is fixed to a flange part 13a formed at one end portion of the case main body 13. A ring gear 14 is fixed to the flange part 13a on the opposite side of the lid member 12. The ring gear 14 is engaged with a drive pinion 3 provided at a drive shaft 2 extending from the engine. In addition, the axle ends of the right and left axles 1 are concentrically inserted into the differential case 11 through the lid member 12 and a side wall part 13b of the case main body 13. The differential case 11 is configured to rotate around the axles 1 by a driving force from the engine through the drive pinion 3 and the ring gear 14.

Case-side fit parts 15 including a plurality of streak grooves extending along the axles are formed at circumferential intervals therebetween on an inner peripheral surface of the case main body 13 along the entire length, and the pair of right and left pressure rings 41 is provided in the case main body 13 so as to be opposed to each other at partially spherical inner surface sides thereof. Protruding streaks 41a are formed on outer peripheral surfaces of the both pressure rings 41 so as to concave-convex fit into the case-side fit parts 15 of the case main body 13. The both pressure rings 41 are provided in the case main body 13 so as to be capable of moving along the axles and incapable of relative rotation by the concave-convex fit of the protruding streaks 41a and the case-side fit parts 15. The size and shape of the differential case 11 can be set arbitrarily according to the vehicle to which the differential device is applied. In addition, the case-side fit parts 15 and the protruding streaks 41a can be formed in any cross section shape as far as the case-side fit parts 15 and the protruding streaks 41a are configured to guide the pressure rings 41 so as to be capable of moving along the axles and incapable of relative rotation with respect to the differential case 11. In the illustrated differential device 10, the eight each case-side fit parts 15 and protruding streaks 41a are provided, but the numbers of the case-side fit parts 15 and the protruding streaks 41a can be set arbitrarily.

The almost cross-shaped pinion shaft 22 is provided in a gear chamber 16 formed between the both pressure rings 41. The pinion shaft 22 has four shaft parts 22a extending orthogonally to the axles 1, and the pinion gears 23 are rotatably supported at the shaft parts 22a. The number of the pinion gears 23 can be set arbitrarily, but at least one pair of the pinion gears 23 is to be provided.

As shown in FIGS. 1, 2, 4(a) and 4(b), the pinion shaft 22 has cam parts 44 at shaft ends thereof, the both pressure rings 41 have cam grooves 45 corresponding to the cam parts 44 at opposed portions of peripheral walls thereof, and the pinion shaft 22 is supported in the gear chamber 16 by sandwiching the cam parts 44 at the shaft parts 22a between the cam grooves 45 in the both pressure rings 41. The cam parts 44 and the cam grooves 45 constitute the operation means 43, which will be described later in detail.

As shown in FIG. 1, one pair of right and left side gears 21 is provided on the inner sides of the right and left pressure rings 41 on both sides of the pinion gears 23. The right and left side gears 21 have at one each end thereof the gear parts 21a engaged with the pinion gears 23. The side gears 21 also have at outer peripheral parts thereof a plurality of protruded gear-side fit parts 24 composed of axially extending protruded streaks at circumferential intervals. The axle end of the left-side axle 1 is fitted into the left side gear 21 by a fitting structure such as spline fitting, and is coupled to the left side gear 21 so as to be incapable of relative rotation. The axle end of the right-side axle 1 is fitted into the right side gear 21 by a fitting structure such as spline fitting, and is coupled to the right side gear 21 so as to be incapable of relative rotation. The cross section shape and number of the gear-side fit parts 24 composed of protruded streaks grooves can be set arbitrarily.

The gear-side fit parts 24 of the both side gears 21 are protruded toward the right and left sides of the both pressure rings 41. The clutch means 30 are attached onto the gear-side fit parts 24 of the side gears 21 on the both sides of the pressure rings 41 along the axles. The right and left clutch means 30 have the inner pawl discs 31 and the outer pawl discs 32 alternately arranged as clutch plates. The outer pawl discs 32 have, at outer peripheral parts thereof, outer pawl parts 32a concave-convex fitted to the case-side fit parts 15 of the differential case 11 at circumferential intervals therebetween. The outer pawl discs 32 are fitted into the differential case 11 so as to be capable of moving along the axles and incapable of relative rotation by the concave-convex fit between the outer pawl parts 32a and the case-side fit parts 15. The inner pawl discs 31 have, at inner peripheral parts thereof, inner pawl parts 31a concave-convex fitted to the gear-side fit parts 24. The inner pawl discs 31 are fitted onto the side gears 21 so as to be capable of moving along the axles and incapable of relative rotation by the concave-convex fit between the inner pawl parts 31a and the gear-side fit parts 24. When the discs 31 and 32 are brought into pressure contact with each other by the movement of the pressure rings 41 in the axial direction, the differential case 11 and the side gears 21 are limited in relative rotation according to a friction force generated between the discs 31 and 32. The numbers of the discs 31 and 32 in the right and left clutch means 30 may be identical or different. Although the numbers of the discs 31 and 32 can be set arbitrarily, too small numbers of the discs 31 and 32 cannot sufficiently perform the differential limiting function, and thus it is preferred to provide the largest numbers of the discs 31 and 32 as far as the size of the differential case 11 permits. In addition, the outer diameters of the discs 31 and 32 in the right and left clutch means 30 are preferably identical but may be different. Further, the clutch means 30 are preferably provided on both right and left sides, but one of the clutch means 30 may be omitted if there is no placement space.

Figure 3A:
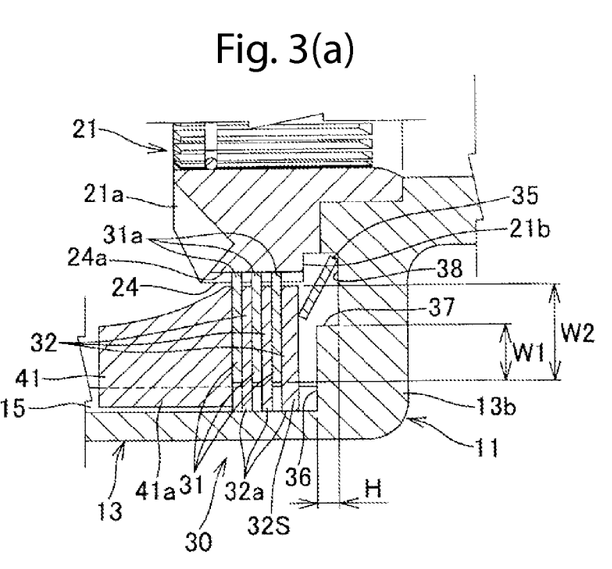
FIG. 3A is a longitudinal cross-section view of a spring member and its neighborhood in the differential device in a non-differential-limited condition.
Figure 3B:
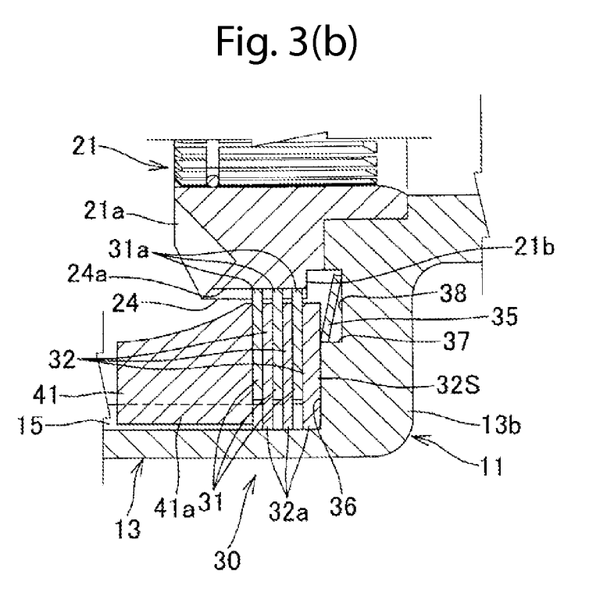
FIG. 3B is a longitudinal cross-section view of the same in a differential-limited condition.

As shown in FIGS. 1 and 3A, pressure-contact surfaces 36 capable of pressure contact with the right and left clutch means 30 are formed on the outer peripheral side of the surface axially opposed to the clutch means 30 at the lid member 12 of the differential case 11 and the side wall part 13b of the case main body 13, and outer pawl discs 32S rotating together with the differential case 11 are arranged on the sides of the right and left clutch means 30 opposed to the pressure-contact surfaces 36 (hereinafter, the outer pawl discs opposed to the pressure-contact surfaces 36 will be referred to as outer pawl discs 32S so as to be differentiated from the other outer pawl discs 32). As shown in FIG. 3B, when the outer pawl discs 32S are brought into pressure contact with the pressure-contact surfaces 36 in the differential-limited condition, it is possible to prevent abrasion on the pressure-contact surfaces 36 and improve durability of the differential device 10.

The outer pawl discs 32S is set to be 120 to 140% thicker than the outer discs 31 and 32. If the thickness of the outer pawl discs 32S is less than 120% of the thickness of the outer discs 31 and 32, the outer pawl discs 32S may be scratched due to contact with the inner peripheral edges of the pressure-contact surfaces 36 in the differential-limited condition. If the thickness of the outer pawl discs 32S exceeds 140%, the differential device 10 increases in weight and size. Thus, the preferred setting is between 120 to 140%. For example, the thickness of the outer pawl discs 32S is set to 2.2 mm, and the thickness of the other discs 31 and 32 is set to 1.7 mm.

Downward stairs 37 are formed at the inner peripheral edges of the pressure-contact surfaces 36. Annular spring storage parts 38 are formed on the inner peripheral sides of the pressure-contact surfaces 36 across the stairs 37. Annular spring members 35 composed of truncated cone-shaped disc springs are stored in the spring storage parts 38 such that the inner peripheral sides of the spring members 35 are positioned at back end surface sides of the spring storage parts 38 and the outer peripheral sides of the spring members 35 are positioned at the outer pawl disc 32S sides.

Figure 7A:
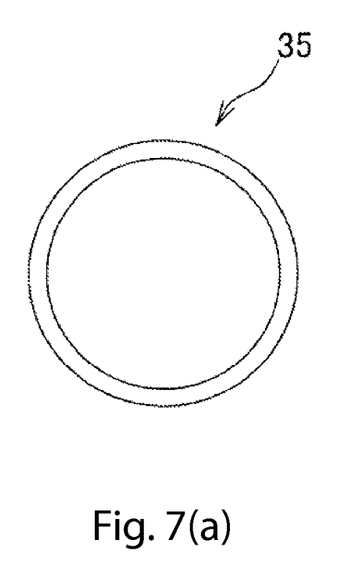
FIG. 7A is a front view of a wave spring and FIG. 7B is a side view of the wave spring.
Figure 7B:
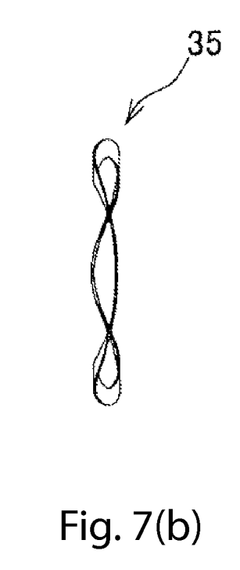

Height H of the stairs 37 in the spring storage parts 38 on the outer peripheral sides is set to be larger than the thickness of the spring members 35, and is set to be smaller than the height of the spring members 35 in a natural state. In the non-differential-limited condition, as shown in FIG. 3A, the outer peripheral parts of the spring members 35 are protruded from the spring storage parts 38 toward the pressure ring 41 sides to bias the discs 31 and 32 toward the pressure ring 41 sides and apply pre-pressures to the discs 31 and 32. In the differential-limited condition, as shown in FIG. 3B, the outer pawl discs 32S of the clutch means 30 are brought into pressure contact with the pressure-contact surfaces 36 to store the entire spring members 35 into the spring storage parts 38 so as not to be fully compressed and bias the discs 31 and 32 toward the pressure ring 41 sides. Accordingly, it is possible to prevent problems caused by the full compression of the spring member 35 in the differential-limited condition, that is, problems that the spring members 35 are prone to wear and tear, and the biasing forces of the spring members 35 become small at the time of transition from the differential state to the differential-limited state to cause slippage in the clutch means 30 and give the driver a feeling of strangeness. In the case of using disc springs as the spring member 35, it is possible to prevent the disc springs from being warped toward the opposite sides. The spring members 35 are intended to remove play between the discs 31 and 32, and the biasing forces of the spring members 35 are set such that little frictional force acts between the discs 31 and 32. The spring members 35 may be annular or coil-shaped wave springs as shown in FIGS. 7(a) and 7(b) or any other annular spring members which can be stored in the spring storage parts 38. In the case of using wave springs, the number of waves in the springs can be set arbitrarily. The thickness of the wave springs is set to be smaller than the height H of the stairs 37, and the height of waves in the wave springs in the natural state is set to be larger than the height H of the stairs 37. It is also preferred that, to prevent the wave springs from contacting the side gears 21 in the non-differential-limited condition as shown in FIG. 3A, the side gears 21 have deeper cutout parts 21b such that the surfaces of the outer pawl discs 32S on the pressure-contact surface 36 sides are positioned nearer the pressure-contact surface 36 sides than the radial surfaces of the cutout parts 21b of the side gears 21.

Width W1 of the pressure-contact surfaces 36 with respect to the radial direction is set to be 80 to 55%, more preferably, 70 to 60%, of width W2 of sliding surfaces between the discs 31 and 32 with respect to the radial direction. The inner peripheral edges of the pressure-contact surfaces 36 are positioned at radially inner sides than the outer peripheral edges of the sliding surfaces between the discs 31 and 32, by 80 to 55%, more preferably, 70 to 60%, of the width W2 of the sliding surfaces. If the width W1 of the pressure-contact surfaces 36 in the differential case 11 is less than 55% of the width W2 of the sliding surfaces between the discs 31 and 32, the surface pressures of the outer pawl discs 32S on the pressure-contact surfaces 36 of the differential cases 11 in the differential-limited condition becomes high to cause problems that the surface pressure on the sliding surfaces between the discs 31 and 32 locally increases and the outer pawl discs 32S are scratched by the inner peripheral edges of the pressure-contact surfaces 36. If the width W1 exceeds 80%, no sufficient suppression areas of the spring members 35 can be obtained with respect to the outer pawl discs 32S. Thus, the width W1 is preferably set to 80 to 55%.

The outer peripheral edges of the spring storage parts 38 are arranged at almost the same positions as those of the inner peripheral edges of the pressure-contact surfaces 36. The inner peripheral edges of the spring storage parts 38 are arranged on radially inner sides than the inner peripheral edges of the inner pawl discs 31, more preferably, on the radially inner sides than the groove bottom surfaces 24a between the gear-side fit parts 24 of the side gears 21. The inner peripheral edges of the spring members 35 are arranged at almost the same positions of the inner peripheral edges of the spring storage parts 38. The outer peripheral edges of the spring members 35 are made slightly smaller in diameter than the outer peripheral edges of the spring storage parts 38 and are in pressure-contact with the surfaces of the outer pawl discs 32S opposed to the spring storage parts 38. Accordingly, by arranging the inner peripheral edges of the spring storage parts 38 on the radially inner sides than the inner peripheral edges of the inner pawl discs 31, in particular, on the radially inner sides than the groove bottom surfaces 24a between the gear-side fit parts 24 of the side gears 21, it is possible to configure the spring members 35 to be as small in diameter as possible and increase the contact areas between the outer pawl discs 32S and the pressure-contact surfaces 36. Accordingly, it is possible to prevent a local increase in surface pressure on the sliding surfaces between the discs 31 an 32 in the differential-limited condition, and decrease the surface pressures between the outer pawl discs 32S and the pressure-contact surfaces 36, thereby to prevent a problem that the outer pawl discs 32S are scratched by the inner peripheral edges of the pressure-contact surfaces 36 and improve durability of the differential device 10.

The annular angular groove-like cutout parts 21b are formed at corner parts of outer peripheral ends of the side gears 21 facing the spring storage parts 38. The cutout parts 21b are configured to allow the spring members 35 to be as small in diameter as possible while preventing interference between the spring members 35 and the side gears 21, and allow the side gears 21 and the contact surfaces of the differential case 11 along the axles to be the same in diameter to prevent uneven wear in the side gears 21 and the differential case 11 caused by their different diameters. The cutout parts 21b are formed as angular grooves but may be formed as tapered surfaces or chamfered curve surfaces. However, if the spring members 35 do not interfere with the side gears 21, the cutout parts 21*b* may not be provided.

Figure 5A:
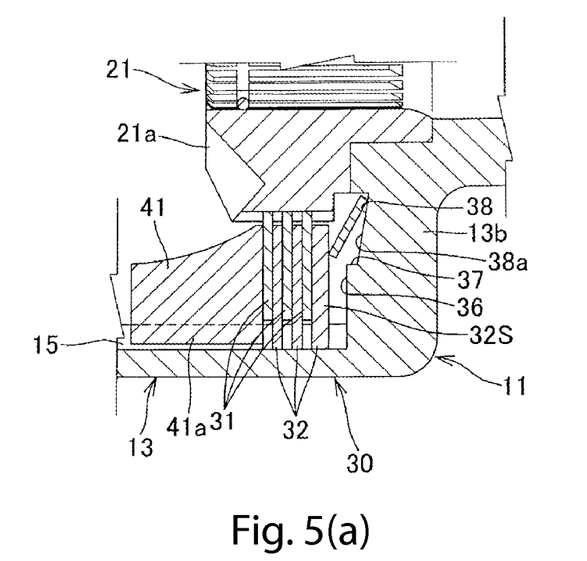
FIGS. 5A and 5B are longitudinal cross-section views of spring members and their neighborhoods in differential devices in other configurations.
Figure 5B:
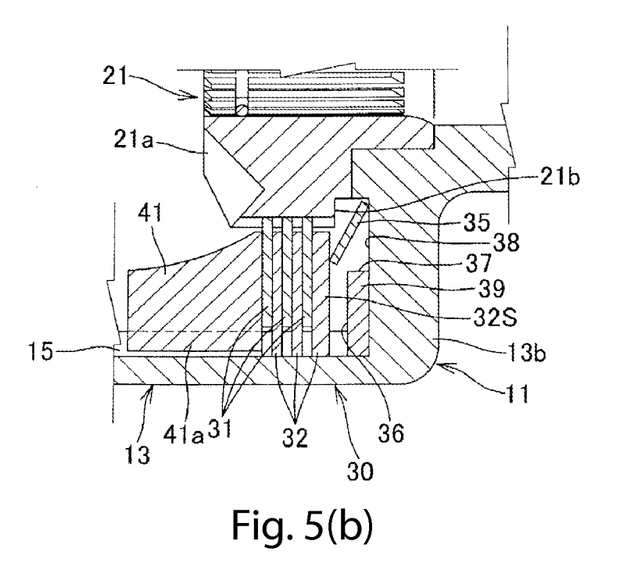

As shown in FIG. 5A, the bottom surfaces 38*a* of the spring storage parts 38 may be formed as tapered surfaces in which the depth of the spring storage parts 38 becomes smaller with increasing proximity to the radially outer side such that the differential case 11 is as thick as possible at positions corresponding to the tapered surfaces, thereby to increase the strength of the differential case 11 as much as possible. In addition, although, in the foregoing embodiment, the spring storage parts 38 are directly formed in the differential case 11, ring-shaped pressure-contact members 39 may be attached to the inside of the differential case 11 so as to be incapable of relative rotation to form the pressure-contact surfaces 36 at the axial end surfaces of the pressure-contact members 39, and the stairs 37 may be formed by the inner peripheral surfaces of the pressure-contact members 39 to form the spring storage parts 38 on the inner peripheral sides of the pressure-contact members 39.

Figure 4A:
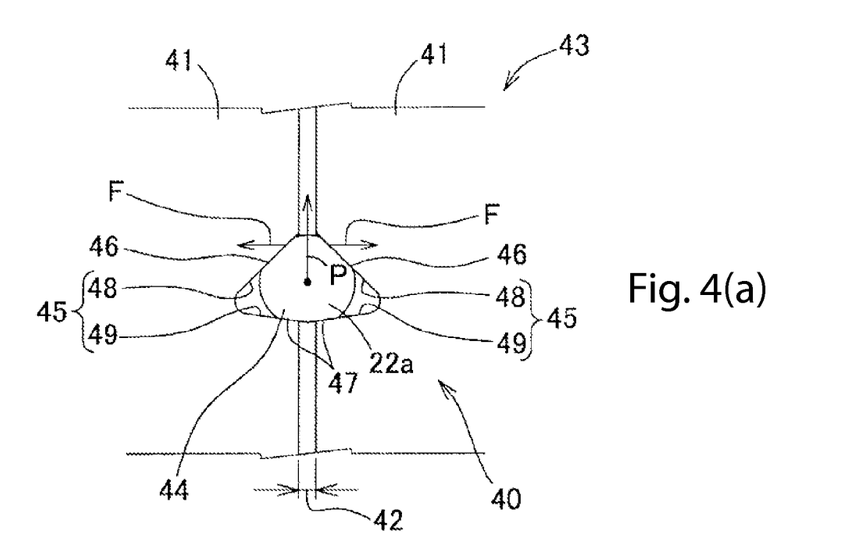
FIGS. 4(a) and 4(b) are illustration diagrams showing a fit state of inner pawl discs and outer pawl discs and side gears.
Figure 4B:
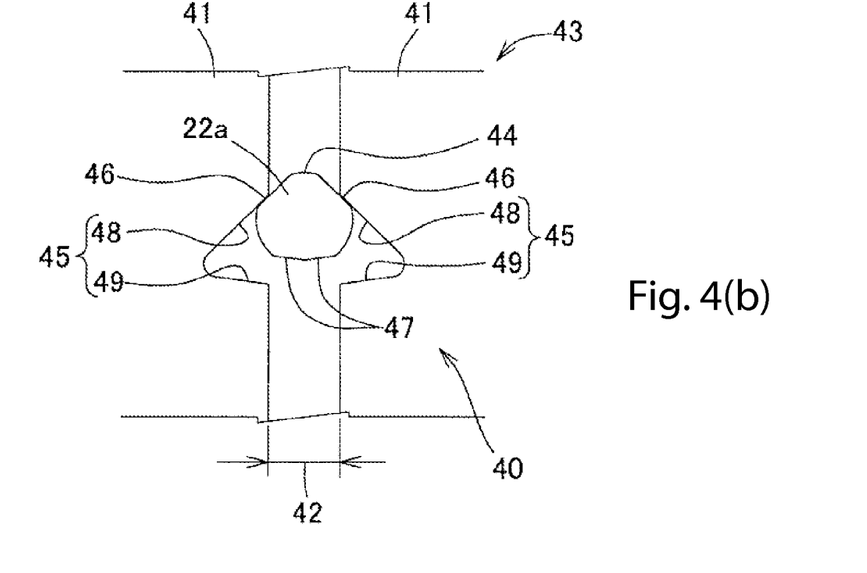

The operation means 43 is composed of cam parts 44 at shaft ends of the four shaft parts 22*a* of the pinion shaft 22 and cam grooves 45 at opposed parts of the pressure rings 41. Each of the cam parts 44 includes: one pair of operation surfaces 46 that are formed in an almost trumpet shape in mirror symmetry with respect to the surface including the center of the shaft part 22*a* orthogonal to the axles; and abutment surfaces 47 that are extended almost along the axles and are formed on the opposite sides of the operation surfaces 46 across the center of the shaft part 22*a*. Each of the cam grooves 45 is formed in an almost regular triangle by an inclined cam surface 48 adapted to the operation surface 46 and a lock surface 49 adapted to the abutment surface 47.

Then, when the pinion shaft 22 in the state shown in FIG. 4A slightly rotates relative to the pressure rings 41 in the direction of arrow P shown in FIG. 4A, the pressure rings 41 move to the direction of arrow F in which to separate from each other via the operation surfaces 46 and the inclined cam surfaces 48 as shown in FIG. 4B. However, if the pinion shafts 22 almost rotate slightly relative to the pressure rings 41 in the direction opposite to the direction of arrow P shown in FIG. 4A, the abutment surfaces 47 are locked on the lock surfaces 49 to control relative rotation of the pressure rings 41 and the pinion shafts 22. However, the operation means 43 may be configured in an arbitrary manner as far as they can operate the pressure rings 41 in the direction to separate from each other by relative rotation torque between the pinion shafts 22 and the differential case 11.

Then, operations of the differential device 10 will be described.

When the differential case 11 rotates by a driving force from the engine, the rotation of the differential case 11 is distributed by the differential means 20 to the right and left axles 1. Then, if rotational resistances in right and left wheels are the same, the rotation of the differential case 11 is distributed to the right and left axles 1 such that the right and left wheels rotate at the same speed. If rotational resistances in the right and left wheels are different, the rotational speed of the wheel with a smaller rotational resistance becomes higher than the rotational speed of the differential case 11, and the rotational speed of the wheel with a larger rotational resistance becomes lower than the rotational speed of the differential case 11, the wheels enter the differential state in which the rotational differences exist between the right and left axles 1 and the differential case 11.

At that time, the clutch means 30 is pressed and operated in the axial direction by the differential-limiting operation means 40 according to the rotational difference between the right and left axles 1. With a small rotational difference, the pressing and operating force from the differential-limiting operation means 40 is weak, and thus the wheels can almost freely rotate relative to each other to keep the differential state, although pre-pressures of the spring members 35 act between the discs 31 and 32 of the clutch means 30. Meanwhile, with a large rotational difference, the pressing and operating force from the differential-limiting operation means 40 becomes strong accordingly, and large contact pressures act between the discs 31 and 32 of the clutch means 30. According to this, part of rotation torque of the wheel with a smaller rotational resistance is distributed to the wheel with a larger rotational resistance, whereby the wheels enter the differential-limited state in which the differential between the right and left wheels is limited.

In addition, in the differential device 10, the annular spring members 35 for applying pre-pressures to between the discs 31 and 32 of the clutch means 30 are arranged in the annular spring storage parts 38 formed in a downward direction via the stairs 37 with a larger height than the height of the spring members 35 in the fully-compressed state. Thus, even when the spring members 35 are pressed and operated by the differential-limiting operation means 40 via the clutch means 30 in the differential-limited condition, the spring members 35 are stored in the spring storage parts 38 without being fully compressed as shown in FIG. 3B. Accordingly, it is possible to prevent problems caused by full compression of the spring members 35 in the differential-limited condition, that is, problems that the spring members 35 are warped toward the opposite sides, the spring members 35 are prone to undergo wear and tear, biasing forces of the spring members 35 become small during transition from the differential state to the differential-limited state to cause slippage in the clutch means 30 which gives the driver a feeling of strangeness. In addition, in the differential-limited condition, most part of the pressing and operating force from the differential-limiting operation means 40 is received by the pressure-contact surfaces 36 of the differential case 11. In the differential device 10 according to the present invention, however, the inner peripheral edges of the spring members 35 are arranged on the radially inner sides than the inner peripheral edges of the inner pawl clutches 31 constituting the clutch means 30 and on the radially inner sides of the groove bottom surfaces 24*a* between the gear-side fit parts 24 of the side gears 21. This makes it possible to configure the spring members 35 to be as small in diameter as possible so that the differential case 11 has a wide contact-pressure surface 36 to increase the contact areas between the outer pawl discs 32S and the pressure-contact surfaces 36. Accordingly, it is possible to prevent a local increase in surface pressure on the sliding surfaces between the discs 31 an 32 in the differential-limited condition, and decrease the surface pressures between the outer pawl discs 32S and the pressure-contact surfaces 36, thereby to prevent a problem that the outer pawl discs 32S are scratched by the inner peripheral edges of the pressure-contact surfaces 36 and improve durability of the differential device 10.

Then, an embodiment in which the present invention is applied to a differential device for FF vehicle will be described. The same members in the differential device for FF vehicle as those in the differential device 10 are given the same reference numerals as those of the members in the differential device 10, and thus descriptions thereof are omitted. The following descriptions are provided only as to different members.

Figure 6:
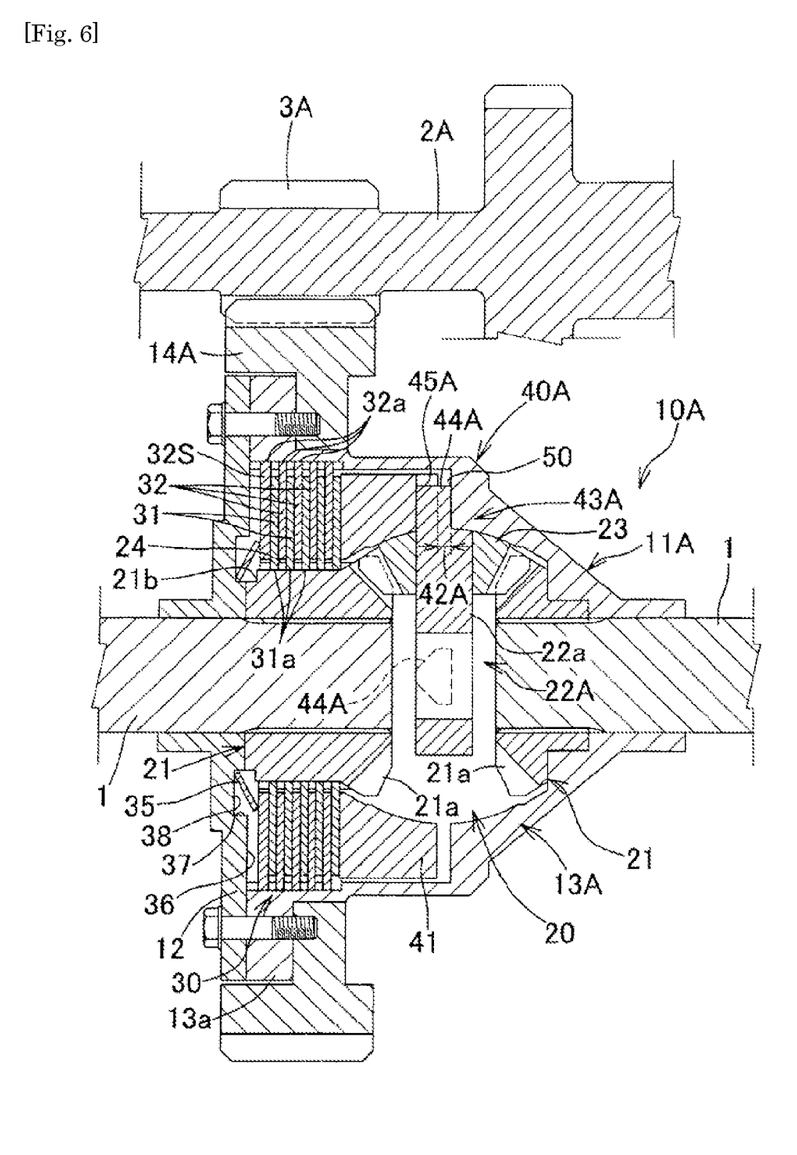
FIG. 6 is a transverse cross-section view of a differential device in another configuration.

Differential device 10A shown in FIG. 6 is a differential device for FF vehicle configured such that: the right clutch means 30, the right pressure ring 41, and the right spring member 35 in the differential device 10 of the foregoing embodiment are removed; instead of the case main body 13, a case main body 13A decreased in diameter at the right part is provided; instead of the operation means 43, an operation means 43A is provided including a cam part 44A at an end portion of a shaft part 22a of a pinion shaft 22A, a cam groove 45A of the left pressure ring 41 for holding the cam part 44A, and a ring opposed surface 50 of a differential case 11A; the pressure ring 41 is operated by the operation means 43A in a direction to increase a clearance 42A between the pressure ring 41 and the ring opposed surface 50 of the differential case 11A, according to increase in relative rotation torque between the pinion shaft 22A and the differential case 11A in the differential state; and instead of the differential-limiting operation means 40, a differential-limiting operation means 40A is provided including the left pressure ring 41 and the operation means 43A.

The differential device 10A is also configured such that: the right pressure-contact surface 36, the right stair 37, and the right spring storage part 38 in the differential device 10 of the foregoing embodiment are removed; at the left side of the differential device 10A, as in the differential device 10 of the foregoing embodiment, the pressure-contact surface 36 is formed so as to be capable of pressure contact with the outer pawl disc 32S of the clutch means 30 in the lid member 12 at an outer peripheral-side portion of a surface axially opposed to the clutch means 30; the downward stair 37 is formed at the inner peripheral edge of the pressure-contact surface 36; and the annular spring storage part 38 for storing the annular spring member 35 is formed on the inner peripheral side of the pressure-contact surface 36 across the stair 37.

The spring member 35 in the differential device 10A is stored in the spring storage part 38 formed in the lid member 12, as with the spring member 35 arranged between the lid member 12 and the clutch means 30 in the foregoing embodiment. In the non-differential-limited condition, the outer peripheral part of the spring member 35 is protruded toward the pressure ring 41 to apply a pre-pressure to the clutch means 30. In the differential-limited condition, the pressure ring 41 is pressed and operated by the operation means 43A toward the lid member 12 side to store the spring member 35 in the spring storage part 38 via the clutch means 30 without being fully compressed. At the same time, the outer pawl disc 32S of the clutch means 30 is brought into pressure contact with the pressure-contact surface 36 so that relative rotation of the differential case 11A and the side gear 21 is limited according to a frictional force generated between the discs 31 and 32.

In the differential device 10A, a rotational force from the engine is transferred to a ring gear 14A attached to the differential case 11A via a drive pinion 3A provided at a drive shaft 2A. When the right and left wheels are the same in rotational resistance, the side gear 21, the pinion gear 23, the pinion shaft 22A, and the clutch means 30 rotate integrally with the differential case 11A to rotate the right and left wheels at the same speed.

Then, if rotational resistances in right and left wheels are the same, the rotation of the differential case 11A is distributed to the right and left axles 1 such that the right and left wheels rotate at the same speed. If rotational resistances in the right and left wheels are different, the rotational speed of the wheel with a smaller rotational resistance becomes higher than the rotational speed of the differential case 11A, and the rotational speed of the wheel with a larger rotational resistance becomes lower than the rotational speed of the differential case 11A, the wheels enter the differential state in which the rotational differences exist between the right and left axles 1 and the differential case 11A. At that time, the clutch means 30 is pressed and operated in the axial direction by the differential-limiting operation means 40A according to the rotational difference between the right and left axles 1. With a small rotational difference, the pressing and operating force from the differential-limiting operation means 40A is weak, and thus the wheels can almost freely rotate relative to each other to keep the differential state, although a pre-pressure of the spring member 35 acts between the discs 31 and 32 of the clutch means 30. Meanwhile, with a large rotational difference, the pressing and operating force from the differential-limiting operation means 40A becomes strong accordingly, and a large contact pressure acts between the discs 31 and 32 of the clutch means 30. According to this, part of rotation torque of the wheel with a smaller rotational resistance is distributed to the wheel with a larger rotational resistance, whereby the wheels enter the differential-limited state in which the differential between the right and left wheels is limited.

In addition, in the differential device 10A, as in the differential device 10 of the foregoing embodiment, the spring member 35 is stored in the spring storage part 38 without being fully compressed in the differential-limited condition. Accordingly, it is possible to prevent problems caused by full compression of the spring member 35, that is, problems that the disc spring as the spring member 35 is warped toward the opposite side, the spring member 35 is prone to undergo wear and tear, a biasing force of the spring member 35 becomes small during transition from the differential state to the differential-limited state to cause slippage in the clutch means 30 which gives the driver a feeling of strangeness. In addition, the inner peripheral edge of the spring member 35 is arranged on the radially inner side than the inner peripheral edge of the inner pawl disc 31 constituting the clutch means 30 and on the radially inner side of the groove bottom surface 24a between the gear-side fit parts 24 of the side gear 21. This makes it possible to configure the spring member 35 to be as small in diameter as possible so that the differential case 11A has a wide contact-pressure surface 36 to increase the contact area between the outer pawl disc 32S and the pressure-contact surface 36 of the differential case 11A. Accordingly, it is possible to prevent a local increase in surface pressure on the sliding surfaces between the discs 31 an 32 in the differential-limited condition, and decrease the surface pressure between the outer pawl discs 32S and the pressure-contact surfaces 36, thereby to prevent a problem that the outer pawl disc 32S is scratched by the inner peripheral edge of the pressure-contact surface 36 and improve durability of the differential device 10A.

As in the foregoing, embodiments of the present invention are described. However, the present invention is not limited to the foregoing embodiments. As a matter of the course, the embodiments of the present invention can be modified in configuration without departing from the gist of the present invention.

REFERENCE SIGNS LIST

1 Axle
2 Drive shaft

3 Drive pinion
10 Differential device
11 Differential case
12 Lid member
13 Case main body
13a Flange part
13b Side wall part
14 Ring gear
15 Case-side fit part
16 Gear chamber
20 Differential means
21 Side gear
21a Gear part
21b Cutout part
22 Pinion shaft
22a Shaft part
23 Pinion gear
24 Gear-side fit part
24a Groove bottom surface
30 Clutch means
31 Inner pawl disc
31a Inner pawl part
32 Outer pawl disc
32S Outer pawl disc
32a Outer pawl part
35 Spring member
36 Pressure-contact surface
37 Stair
38 Spring storage part
38a Bottom surface
39 Pressure-contact member
40 Differential-limiting operation means
41 Pressure ring
41a Protruding streak
42 Clearance
43 Operation means
44 Cam part
45 Cam groove
46 Operation surface
47 Abutment surface
48 Inclined cam surface
49 Lock surface
2A Drive shaft
3A Drive pinion
10A Differential device
11A Differential case
13A Case main body
14A Ring gear
22A Pinion shaft
40A Differential-limiting operation means
42A Clearance
43A Operation means
44A Cam part
45A Cam groove
50 Ring opposed surface

The invention claimed is:

1. A differential device, comprising:
a differential case that rotates by a driving force from an engine;
a differential means that distributes the rotation of the differential case to right and left axles;
a clutch means that is capable of limiting a differential in the differential means;
an annular spring member that applies a pre-pressure to the clutch means; and
a differential-limiting operation means that presses and operates the clutch means in an axial direction, wherein
a pressure-contact surface capable of pressure-contact with the clutch means is provided in the differential case on an outer peripheral side of a surface axially opposed to the clutch means,
a downward stair with a larger height than height of the spring member in a fully-compressed state is provided at an inner peripheral edge of the pressure-contact surface,
an annular spring storage part for storing the spring member is provided in the differential case on an inner peripheral side of the pressure-contact surface, and
the inner peripheral edge of the spring member is arranged on a radially inner side than inner peripheral edges of a plurality of clutch plates constituting the clutch means,
wherein the inner peripheral edge of the spring member is configured to be smaller in diameter than a groove bottom surface of a fitting part of a side gear fitted into the clutch plates, and the spring member contacts at least one of the clutch plates in a mid-section thereof.

2. The differential device according to claim 1, wherein, as the spring member, a disc spring or a wave spring is provided.

3. The differential device according to claim 1, wherein a width of the pressure-contact surface is set to 80 to 55% of a width of sliding surfaces between the clutch plates.

4. The differential device according to claim 1, wherein, of the plurality of clutch plates constituting the clutch means, the clutch plates to be in pressure-contact with the pressure-contact surface are thicker than the clutch plates not to be in pressure-contact with the pressure-contact surface.

5. The differential device according to claim 1, wherein, of the plurality of clutch plates constituting the clutch means, a thickness of the clutch plates to be in pressure-contact with the pressure-contact surface is set to 120 to 140% of the thickness of the clutch plates not to be in pressure-contact with the pressure-contact surface.

6. The differential device according to claim 1, wherein the differential means includes: a pair of side gears that is provided at axle ends of the right and left axles so as to be incapable of relative rotation and is concentrically opposed to each other in the differential case; a pinion shaft that is provided between the pair of side gears orthogonal to axial cores of the side gears and is rotated with the differential case; and at least one pair of pinion gears that is rotatably provided at the pinion shaft and is engaged with the pair of side gears.

7. The differential device according to claim 6, wherein the plurality of clutch plates constituting the clutch means is composed of one or more inner pawl discs and outer pawl discs that are alternately arranged in an axial direction of the side gears between outer peripheral surfaces of the side gears and an inner peripheral surface, the outer pawl discs being opposed to the pressure-contact surface.

8. A differential device, comprising:
a differential case that rotates by a driving force from an engine;
a differential means that distributes the rotation of the differential case to right and left axles;
a clutch means that is capable of limiting a differential in the differential means;
an annular spring member that applies a pre-pressure to the clutch means; and
a differential-limiting operation means that presses and operates the clutch means in an axial direction, wherein a pressure-contact surface capable of pressure-contact with the clutch means is provided in the differential case on an outer peripheral side of a surface axially opposed to the clutch means, a downward stair with a larger height than height of the spring member in a fully-compressed state is provided at an inner peripheral edge of the pressure-contact surface, an annular spring storage part for storing the spring member is provided in the differential case on an inner peripheral side of the pressure-contact surface, and the inner peripheral edge of the spring member is arranged on a radially inner side than inner peripheral edges of a plurality of clutch plates constituting the clutch means, wherein the differential means includes: a pair of side gears that is provided at axle ends of the right and left axles so as to be incapable of relative rotation and is concentrically opposed to each other in the differential case; a pinion shaft that is provided between the pair of side gears orthogonal to axial cores of the side gears and is rotated with the differential case; and at least one pair of pinion gears that is rotatably provided at the pinion shaft and is engaged with the pair of side gears, wherein the inner peripheral edge of the spring member is configured to be smaller in diameter than a groove bottom surface of a fitting part of a side gear fitted into the clutch plates, and the spring member contacts at least one of the clutch plates in a mid-section thereof, wherein the differential-limiting operation means is configured to have a pressure ring that presses the clutch means onto the pressure-contact surface against a biasing force of the spring member, according to a relative rotation force of the pinion shaft and the differential case.

* * * * *